US008765032B2

(12) United States Patent
Auffahrt et al.

(10) Patent No.: US 8,765,032 B2
(45) Date of Patent: Jul. 1, 2014

(54) PROCESS FOR PRODUCING A GRAPHITE CAGE FOR AN ANTI-FRICTION BEARING, WHICH CAGE HOLDS A PLURALITY OF ANTI-FRICTION ELEMENTS

(75) Inventors: Knut Auffahrt, Wilhelmsdorf (DE); Juergen Gierl, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 748 days.

(21) Appl. No.: 12/670,136

(22) PCT Filed: Jul. 15, 2008

(86) PCT No.: PCT/EP2008/059244
§ 371 (c)(1),
(2), (4) Date: Feb. 10, 2010

(87) PCT Pub. No.: WO2009/013181
PCT Pub. Date: Jan. 29, 2009

(65) Prior Publication Data
US 2010/0142876 A1   Jun. 10, 2010

(30) Foreign Application Priority Data
Jul. 24, 2007  (DE) .......................... 10 2007 034 487

(51) Int. Cl.
*F16C 33/66*   (2006.01)
(52) U.S. Cl.
USPC ............................ 264/29.1; 384/523; 384/527

(58) Field of Classification Search
USPC .................................. 384/523, 527; 264/29.1
See application file for complete search history.

(56) References Cited

U.S. PATENT DOCUMENTS 5,356,227 A * 10/1994 Sibley et al. .................. 384/463

FOREIGN PATENT DOCUMENTS

DE          36 11 907 A       10/1986
DE       102005035855 A1 *    8/2006
JP          03272320 A        12/1991

OTHER PUBLICATIONS

Rottmair et al., DE 10 2005 035 855 A1, Derwent Abstract, Aug. 3, 2006.*
Gruhl et al., "Net-shaped processing of graphite with tailored porosity via powder injection molding of mesophase carbon", The American Carbon Society, Carbon Conference 2007, held at Sheraton Hotel and Towers, Seattle, Washington, Jul. 15-20, 2007, available at http://acs.omnibooksonline.com.*

* cited by examiner

*Primary Examiner* — Galen Hauth
(74) *Attorney, Agent, or Firm* — Simpson & Simpson, PLLC

(57) ABSTRACT

A process for producing a graphite cage for an anti-friction bearing, which cage holds a plurality of anti-friction elements. A cage injection molding is injected in an injection molding process from a mass which contains carbon mesophase powder, and this cage injection molding is subsequently heat-treated in order to transform the carbon from the mesophase into pure graphite.

7 Claims, 2 Drawing Sheets

PROCESS FOR PRODUCING A GRAPHITE CAGE FOR AN ANTI-FRICTION BEARING, WHICH CAGE HOLDS A PLURALITY OF ANTI-FRICTION ELEMENTS

This application is a 371 of PCT/EP2008/059244 filed Jul. 15, 2008, which in turn claims the priority of DE 10 2007 034 487.4 filed Jul. 24, 2007, the priority of both applications is hereby claimed and both applications are incorporated by reference herein.

FIELD OF THE INVENTION

The invention relates to a process for producing a graphite cage, which holds a plurality of rolling elements, for a rolling bearing.

BACKGROUND OF THE INVENTION

In different fields of application, for example vacuum technology, the processing of food products or productronics, it is impossible or undesirable to lubricate rolling bearings with grease or oil, or the operating temperature is higher than the heat resistance of the lubricant. There is therefore a need for special rolling bearings which have a high temperature resistance and media resistance while simultaneously having optimum rolling bearing properties and also being suitable for a dry run. Since a lubricant in grease or oil form is dispensed with and owing to the high temperature resistance, these rolling bearings are highly suited to use in food technology installations and in bearing points subjected to high temperatures, for example in an internal combustion engine or the like.

Suitable, known rolling bearings such as these frequently have ceramic rolling elements which, however, bear a high risk of fracture when subjected to repeated, pulse-like stresses. The production of these rolling elements is also expensive and often not economically justifiable. In addition, needle rollers cannot be produced from ceramic materials, and therefore ball bearings with ceramic balls are primarily available.

However, it is also known to equip rolling bearings with a graphite cage in which the rolling elements are held. Graphite itself is suitable as a lubricant; i.e. as a result of the minimal abrasion of graphite from the cage, a rolling bearing of this type has self-lubrication and can therefore be used in the critical fields of use mentioned. However, to date, a drawback is that graphite cages such as these had to be produced in a complex manner with material removal by turning or milling. This production process is complicated, as has already been indicated in DE 36 11 907. This is because a graphite component of this type has a high susceptibility to fracture, and this is problematic during production. Therefore, the production of graphite cages produced with material removal is carried out only on a small scale and is very expensive. Nevertheless, highly effective rolling bearings with minimal self-lubrication can be assembled using such a graphite cage, and these rolling bearings are outstandingly suitable for dry running applications and other applications with minimum amounts of lubrication or media lubrication applications.

SUMMARY OF THE INVENTION

The invention is therefore based on the problem of specifying a process for producing a graphite cage which is simplified from than material-removing production processes known to date.

According to the invention, this problem is solved in a process of the type mentioned in the introduction, in that a cage injection molding is injected in an injection molding process from a mass which contains carbon mesophase powder, and this cage injection molding is subsequently subjected to heat treatment in order to convert the carbon from the mesophase to pure graphite.

The invention is based on the advantageous realization that it is possible to use an injection molding process to produce a cage injection molding, the main constituent of which is a carbon powder present in the mesophase. This is possible owing to the use of a powder injection molding (PIM) process. A powder injection molding process of this type makes it possible to produce cage injection moldings which substantially correspond, in shape and size, to the finished graphite element, but only have to be graphitized in a heat treatment process in order to convert the carbon from the mesophase to graphite. In the injection molding process, it is possible to produce cages having a wide variety of geometries, since use is made of a plastically deformable mass which is then merely subjected to heat treatment. No mechanical, in particular material-removing subsequent processing steps are required, and therefore the problems mentioned in the introduction are advantageously not present in the process according to the invention. The virtually free shapability also makes it possible to produce cages for holding rolling elements of different configuration, and therefore it is possible to produce ball bearings and also needle bearings, roller bearings or barrel bearings using a graphite cage which is produced according to the invention and ensures the self-lubrication of every type of bearing.

The heat treatment for graphitization is preferably carried out at a temperature of 1800°-3200° C., in particular between 2000°-3000° C.

In a development of the invention it may be provided that, after the cage injection moldings have been injected, initially a present binder is removed by treatment at a temperature of 150°-600° C., in particular between 200°-500° C., after which the heat treatment for graphitization is carried out. In addition to the carbon mesophase powder and one or more additives, which serve for graphitization, the injection molding mass used also contains a binder component which serves to produce the mass and to set the viscosity of the mass. This binder is still present in the cage injection molding, i.e. the cage green preform, and needs to be removed. This is done by the thermal removal of the binder described. As the temperature increases, the viscosity of the binder or of the different binder components is reduced, and the binder or binder components then evaporate or decompose, in which case the binder removal operation lasts for several hours. The injection molding from which the binder is removed, this molding frequently also being referred to as a brown preform, is then subjected to heat treatment for graphitization.

As an alternative to the thermal removal of the binder, it is also possible to remove the binder from the cage injection molding catalytically; this is associated with shorter process times in the range of, for example, 2-3 hours. This process is a special type of thermal decomposition which takes place usually at lower temperatures than the thermal removal of the binder, for example in the range between 50-150° C. This catalytic removal of the binder is possible since a gaseous catalyst, e.g. $HNO_3$, is added to the atmosphere in the binder removal furnace.

Furthermore, liquid removal of the binder or removal of the binder using supercritical $CO_2$ is also conceivable in principle, but a remarkably high process outlay is associated with each of these binder removal processes.

In addition to the process according to the invention, the invention also relates to a rolling bearing comprising an inner race, an outer race and a plurality of rolling elements which are held in a graphite rolling element cage produced without the removal of material by the process of the described type. The inner race and the outer race and also the rolling elements can consist of a wide variety of steels which should be chosen according to the respective application. Corrosion-resistant steel can be used if a rolling bearing is intended to be used in a corrosive environment, or heat-resistant steel or case-hardened steel can be used if high demands are made in terms of hardness, and conventional steel can also be used, it being self-evident that the individual components can also consist of different types of steel.

BRIEF DESCRIPTION OF THE DRAWINGS

Further advantages and details of the invention are described below on the basis of exemplary embodiments and with reference to the figures. The figures are schematic illustrations and show.

DETAILED DESCRIPTION OF THE DRAWINGS

Figure 1:
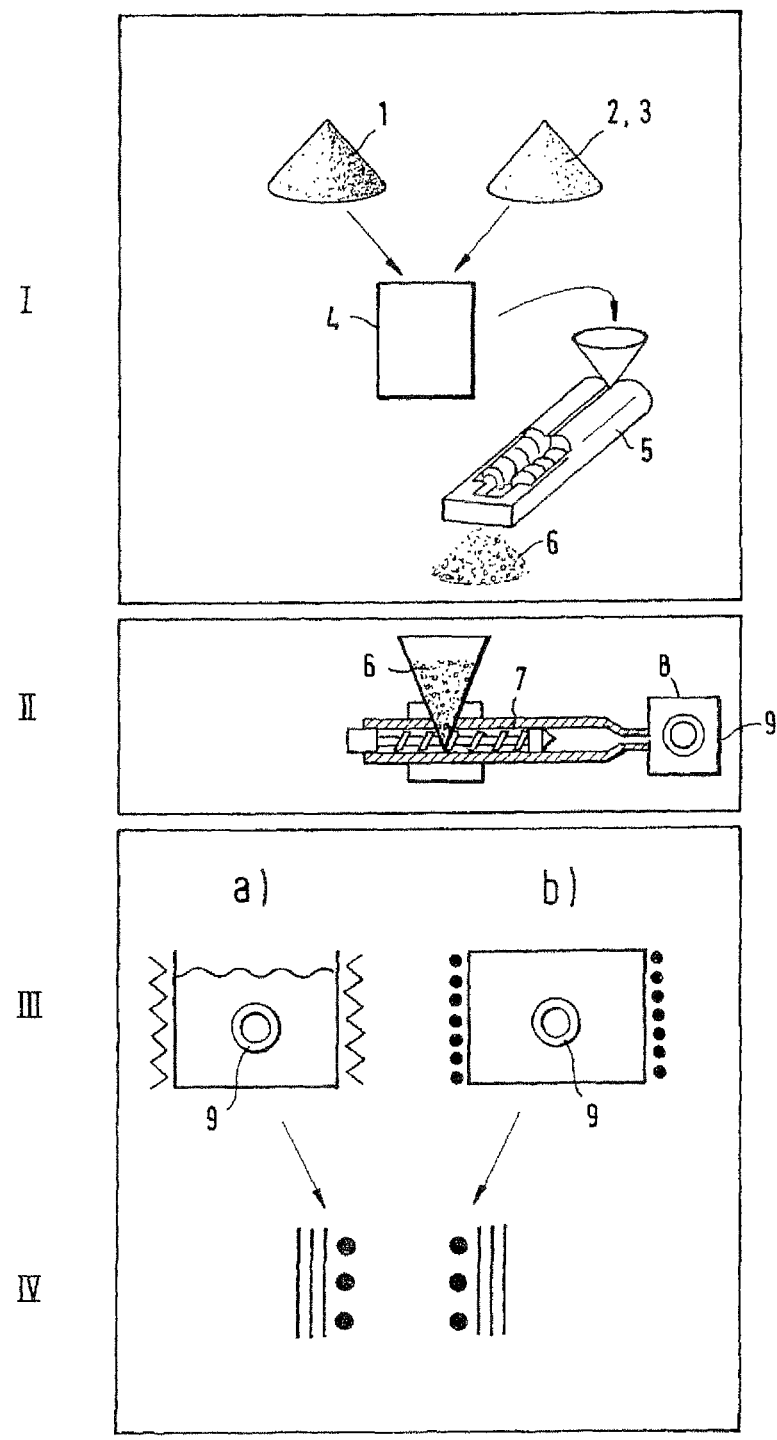
FIG. 1 a basic illustration for explaining the process according to the invention.

FIG. 1 shows, in the form of a basic illustration, the sequence of a process, according to the invention, for producing a rolling bearing cage.

Section I first shows the preparation operation for producing granules from which the injectable mass is melted. Starting from a carbon mesophase powder 1 and a mixture of a binder 2 and one or more additives 3, which serve for graphitization, step 4 initially involves the production of a mixture which is then processed in a granulating step 5 using an extruder with a downstream granulating device, such that the end product obtained is granules 6 which are in the form of small, hardened pellets or granules and consist of the carbon mesophase powder, the additive(s) and the binder. These granules can be produced as separate processing material and then, when graphite cages are to be produced, processed, if required.

The processing first takes place in step II which shows the shaping process. The granules 6 are placed in an extruder 7, wherein an injection molding device 8 is connected downstream of said extruder. This injection molding system is designed for the powder injection molding (PIM) process and can therefore process masses which consist of a powder. First of all, the granules are melted in the extruder 7, after which the molten mass is supplied to the injection molding device 8 in which the rolling bearing cages are then injection-molded, as shown in principle in FIG. 1. The binder is then removed from these cage injection moldings 9 or green preforms in step III, if appropriate after preceding drying; i.e. the binder content is removed. As shown at a), this can be done catalytically when a corresponding catalyst, e.g. $HNO_3$, is supplied to the gas phase in the binder removal system. This catalyst makes it possible to carry out the decomposition or evaporation process of the binder or of the binder components at substantially lower temperatures. Alternatively, as shown at b), it is also possible to provide thermal removal of the binder; in this process, however, the cage injection moldings 9 have to be heated to higher temperatures in the range between 200°-500° C., whereas the catalytic removal of the binder can proceed at temperatures below 200° C.

The injection moldings 9 from which the binder is removed, also referred to as brown preforms, are then, in step IV, subjected to subsequent heat treatment for converting the carbon mesophase powder, which has already been pre-sintered slightly by the removal of the binder, in particular in the case of thermal removal of the binder, to pure graphite. This takes place in a corresponding furnace at temperatures in the range of 2000°-3000° C. During this treatment, the injection molding 9 is sintered completely and, in conjunction with the additives, the carbon from the mesophase is converted to graphite. This graphitization step also lasts for several hours. After cooling, graphite cages which are ready to use and do not require subsequent material-removing treatment are present.

Figure 2:
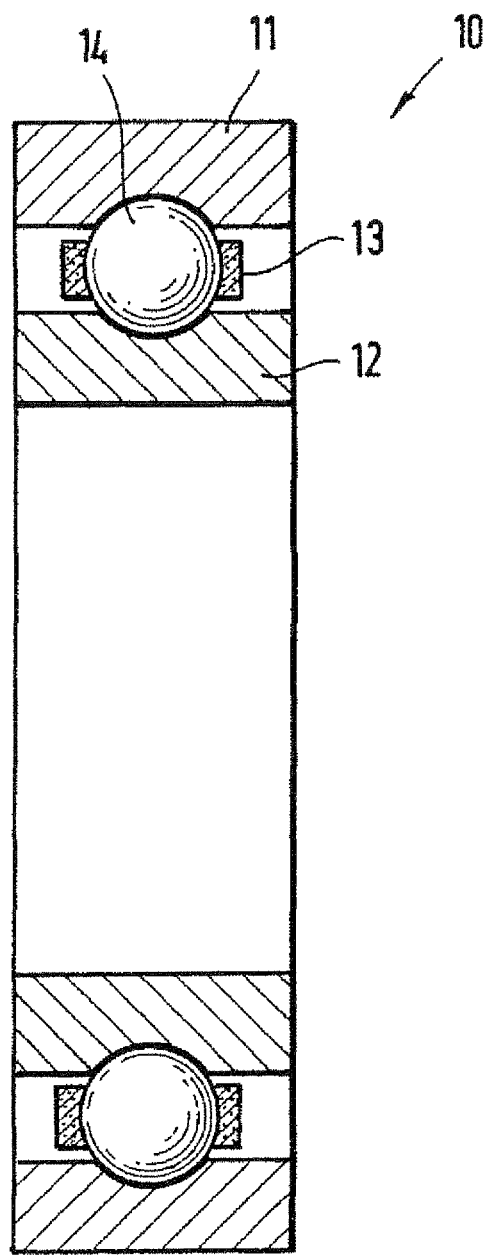
FIG. 2 a sectional view, in the form of a basic illustration, through a rolling bearing according to the invention.

FIG. 2 shows, in the form of a basic illustration, a rolling bearing 10 according to the invention, comprising an outer race 11, an inner race 12 and a graphite cage 13 which is produced by the process according to the invention and in which rolling elements 14, in this case balls, are held. The outer race 11, the inner race 12 and the rolling elements 14 may consist of steel which is selected depending on the intended use, for example of corrosion-resistant steel if the rolling bearing is used in a corrosive environment. However, it is also possible to use a heat-resistant steel, a case-hardened steel or a conventional steel. The rolling bearing 10 according to the invention is suitable, in particular, for dry running applications. This is because the minimal abrasion of the graphite from the graphite cage 13 resulting from the movement of the bearing or rolling elements is sufficient to ensure minimal lubrication, and therefore the rolling bearing according to the invention can also be used in critical fields of application.

| Reference Numerals | |
|---|---|
| 1 | Carbon mesophase powder |
| 2 | Binder |
| 3 | Additives |
| 4 | Step |
| 5 | Granulating step |
| 6 | Granules |
| 7 | Extruder |
| 8 | Injection molding device |
| 9 | Cage injection molding |
| 10 | Rolling bearing |
| 11 | Outer race |
| 12 | Inner race |
| 13 | Graphite cage |
| 14 | Rolling elements |

The invention claimed is:

1. A process for producing a graphite cage, which holds a plurality of rolling elements, for a rolling bearing,
wherein a cage injection molding in a shape of the graphite cage that holds a plurality of rolling elements is injected in an injection molding process from a mass which contains carbon mesophase powder, and the cage injection molding is subsequently subjected to heat treatment in order to convert carbon from mesophase to pure graphite to produce the graphite cage that holds a plurality of rolling elements.

2. The process of claim 1, wherein the heat treatment for graphitization is carried out at a temperature of 1800-3200° C.

3. The process of claim 1, wherein, after each cage injection molding has been injected, a hinder which is present is removed by treatment initially at a temperature of 150-600° C., after which the heat treatment for graphitization is carried out.

4. The process of claim 3, wherein the binder is removed catalytically after each cage injection molding has been injected.

5. The process of claim 1, wherein the heat treatment for graphitization is carried out at a temperature between 2000-3000° C.

6. The process of claim 1, wherein, after each cage injection molding has been injected, a binder which is present is removed by treatment initially at a temperature between 200-500° C., after which the heat treatment for graphitization is carried out.

7. The process of claim 6, wherein the binder is removed catalytically after each cage injection molding has been injected.

* * * * *